(12) United States Patent
Bulut et al.

(10) Patent No.: US 10,540,496 B2
(45) Date of Patent: Jan. 21, 2020

(54) DYNAMIC RE-COMPOSITION OF PATCH GROUPS USING STREAM CLUSTERING

(71) Applicant: International Business Machines Corporation, Armonk, NY (US)

(72) Inventors: Muhammed Fatih Bulut, New York, NY (US); Jinho Hwang, Ossining, NY (US); Vugranam C. Sreedhar, Yorktown Heights, NY (US); Sai Zeng, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 168 days.

(21) Appl. No.: 15/721,566

(22) Filed: Sep. 29, 2017

(65) Prior Publication Data

US 2019/0102548 A1    Apr. 4, 2019

(51) Int. Cl.
| | | |
|---|---|---|
| *G06F 12/16* | (2006.01) | |
| *G06F 21/56* | (2013.01) | |
| *G06F 11/34* | (2006.01) | |

(52) U.S. Cl.
CPC ........ *G06F 21/561* (2013.01); *G06F 11/3404* (2013.01); *G06F 11/3495* (2013.01); *G06F 21/568* (2013.01)

(58) Field of Classification Search
USPC .............................. 726/22–25; 713/187–189
See application file for complete search history.

(56) References Cited

U.S. PATENT DOCUMENTS

| 7,000,247 | B2 | 2/2006 | Banzhof | |
| 7,424,706 | B2* | 9/2008 | Ivanov | G06F 21/57 |
| | | | | 717/169 |
| 7,647,637 | B2 | 1/2010 | Schuba et al. | |
| 7,712,137 | B2* | 5/2010 | Meier | H04L 63/1433 |
| | | | | 713/152 |

(Continued)

FOREIGN PATENT DOCUMENTS

| CN | 102404715 A | 4/2012 |
| WO | 2015105486 A1 | 7/2015 |

OTHER PUBLICATIONS

International Search Report and Written Opinion received for PCT Application Serial No. PCT/IB2018/057407 dated Jan. 29, 2019, 11 pages.

(Continued)

*Primary Examiner* — Amare F Tabor
(74) *Attorney, Agent, or Firm* — Amin, Turocy & Watson, LLP

(57) ABSTRACT

Techniques for dynamic server groups that can be patched together using stream clustering algorithms, and learning components in order to reuse the repeatable patterns using machine learning are provided herein. In one example, in response to a first risk associated with a first server device, a risk assessment component patches a server group to mitigate a vulnerability of the first server device and a second server device, wherein the server group is comprised of the first server device and the second server device. Additionally, a monitoring component monitors data associated with a second risk to the server group to mitigate the second risk to the server group.

25 Claims, 13 Drawing Sheets

(56) References Cited

U.S. PATENT DOCUMENTS

| | | | |
|---|---|---|---|
| 7,900,259 B2* | 3/2011 | Jeschke | H04L 63/1433 713/164 |
| 8,793,681 B2* | 7/2014 | Ayachitula | G06F 8/65 717/171 |
| 9,069,969 B2* | 6/2015 | Ayachitula | G06F 21/577 |
| 9,405,530 B2 | 8/2016 | Islam et al. | |
| 9,430,219 B2 | 8/2016 | Kruempelmann et al. | |
| 9,436,457 B2 | 9/2016 | Mencias et al. | |
| 9,521,160 B2 | 12/2016 | Ng et al. | |
| 2006/0021042 A1* | 1/2006 | Choi | G06F 21/568 726/24 |
| 2016/0085970 A1* | 3/2016 | Rebelo | G06F 21/51 726/25 |
| 2016/0254963 A1 | 9/2016 | Vibhor et al. | |
| 2017/0187745 A1 | 6/2017 | Ng et al. | |

OTHER PUBLICATIONS

Mell, Peter, et al. "The NIST Definition of Cloud Computing." National Institute of Standards and Technology. Sep. 2011. 7 pages.

"Extension of Microsoft WSUS to Manage Third Party Patches with Patch Manager," 2017, SolarWinds Worldwide, LLC, 7 pages. Retrieved on Jul. 6, 2017. http://www.solarwinds.com/solutions/microsoft-wsus-patch-management.

"Advanced Cloud Technology—Intelligent, Coordinated, Context-Based Server Node Upgrades to Maximize Security and Availability," IPCOM000218158D, IP.com, May 24, 2012, 6 pages.

"A Cloud Platform-Layer System and Method to Orchestrate Ordering and Rolling during VMs Maintenance with Optimization Execution Plan," IPCOM000242011D, IP.com, Jun. 14, 2015, 5 pages.

"Smart Recommendations for Patch/Fix Pack in the Cloud," IPCOM000228641D, IP.com, Jun. 26, 2013, 4 pages.

Aggarwal, et al., "A Framework for Clustering Evolving Data Streams," Proceedings of the 29th VLDB Conference, Berlin, Germany, 2003, 12 pages.

Yang, et al., "Effective Multi-Label Active Learning for Text Classification," KDD'09, Jun. 28-Jul. 1, 2009, Paris, France, 9 pages.

* cited by examiner

FIG. 8

802 — IN RESPONSE TO A FIRST RISK ASSOCIATED WITH A FIRST SERVER DEVICE, PATCHING, BY A DEVICE OPERATIVELY COUPLED TO A PROCESSOR, A SERVER GROUP TO MITIGATE A VULNERABILITY OF THE FIRST SERVER DEVICE AND A SECOND SERVER DEVICE, WHEREIN THE SERVER GROUP IS COMPRISED OF THE FIRST SERVER DEVICE AND THE SECOND SERVER DEVICE

804 — MONITORING, BY THE DEVICE, DATA ASSOCIATED WITH A SECOND RISK TO THE SERVER GROUP TO MITIGATE THE SECOND RISK TO THE SERVER GROUP

DYNAMIC RE-COMPOSITION OF PATCH GROUPS USING STREAM CLUSTERING

BACKGROUND

The subject disclosure relates to cloud management, and more specifically, to dynamic re-composition of patch groups using stream clustering.

SUMMARY

The following presents a summary to provide a basic understanding of one or more embodiments of the disclosure. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate dynamic re-composition of patch groups using stream clustering are described.

According to an embodiment, a system can comprise a memory that stores computer executable components, and a processor that executes the computer executable components stored in the memory. The computer executable components of the system can comprise a risk management component that, in response to a first risk associated with a first server device, patches a server group to mitigate a vulnerability of the first server device and a second server device, wherein the server group is comprised of the first server device and the second server device. The computer executable components of the system can also comprise a monitoring component that, monitors data associated with a second risk to the server group to mitigate the second risk to the server group.

According to another embodiment, a computer program product that facilitates server group patching can comprise a computer readable storage medium having program instructions embodied therewith. The program instructions can be executable by a processor and the processor can in response to a first risk associated with a first server device, patch a server group to mitigate a vulnerability of the first server device and a second server device, wherein the server group is comprised of the first server device and the second server device. The program instructions can also be executable to monitor, by the processor, data associated with a second risk to the server group to mitigate the second risk to the server group.

According to yet another embodiment, a computer-implemented method is provided. The computer-implemented method can comprise in response to a first risk associated with a first server device, patching, by a device operatively coupled to a processor, a server group to mitigate a vulnerability of the first server device and a second server device, wherein the server group is comprised of the first server device and the second server device. The computer-implemented method can also comprise, monitoring, by the device, data associated with a second risk to the server group to mitigate the second risk to the server group.

According to yet another embodiment, a system can comprise a memory that stores computer executable components, and a processor that executes the computer executable components stored in the memory. The computer executable components of the system can comprise a risk management component that, in response to a first risk associated with a first server device, patches a server group to mitigate a vulnerability of the first server device and a second server device, wherein the server group is comprised of the first server device and the second server device. The computer executable components of the system can also comprise a monitoring component that, monitors data associated with a second risk to the server group to mitigate the second risk to the server group. Furthermore, the computer executable components of the system can also comprise a learning component that analyzes risk data associated with a previous risk received from a workstation device, resulting in a risk prediction.

According to yet another embodiment, a computer program product that facilitates server group patching can comprise a computer readable storage medium having program instructions embodied therewith. The program instructions can be executable by a processor and the processor can in response to a first risk associated with a first server device, patch a server group to mitigate a vulnerability of the first server device and a second server device, wherein the server group is comprised of the first server device and the second server device. The program instructions can also be executable to monitor, by the processor, data associated with a second risk to the server group to mitigate the second risk to the server group. The program instructions can also be executable to analyze, by the processor, risk data associated with a previous risk received from a workstation device, resulting in a risk prediction.

In some embodiments, one or more of the above elements described in connection with the systems, computer-implemented methods and/or computer program programs can be embodied in different forms such as a computer-implemented method, a computer program product, or a system.

DESCRIPTION OF THE DRAWINGS

FIG. 8 illustrates a flow diagram of an example, non-limiting computer-implemented method that facilitates grouping and patching of machines in accordance with one or more embodiments described herein.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Machines operating within the same environment can benefit from the same software patch (e.g., patch group) to mitigate common vulnerabilities. For example, an application can be executed on multiple servers. Thus, a web server, a database, and/or a cache, can run an application on multiple servers or different physical machines, which can increase vulnerability to malware, viruses, attacks, etc. Because some machines can share common vulnerabilities, grouping the machines together and applying a patch to the group can create a better defense and/or security against common vulnerabilities, as opposed to patching the machines one at a time.

One or more embodiments described herein can patch a group of machines that share a common vulnerability. The patch group can be defined in different granularities and the patch group can be dynamically adjusted. One or more embodiments described herein include systems, computer-implemented methods, apparatus, and computer program products that facilitate patching of machines.

Figure 1:
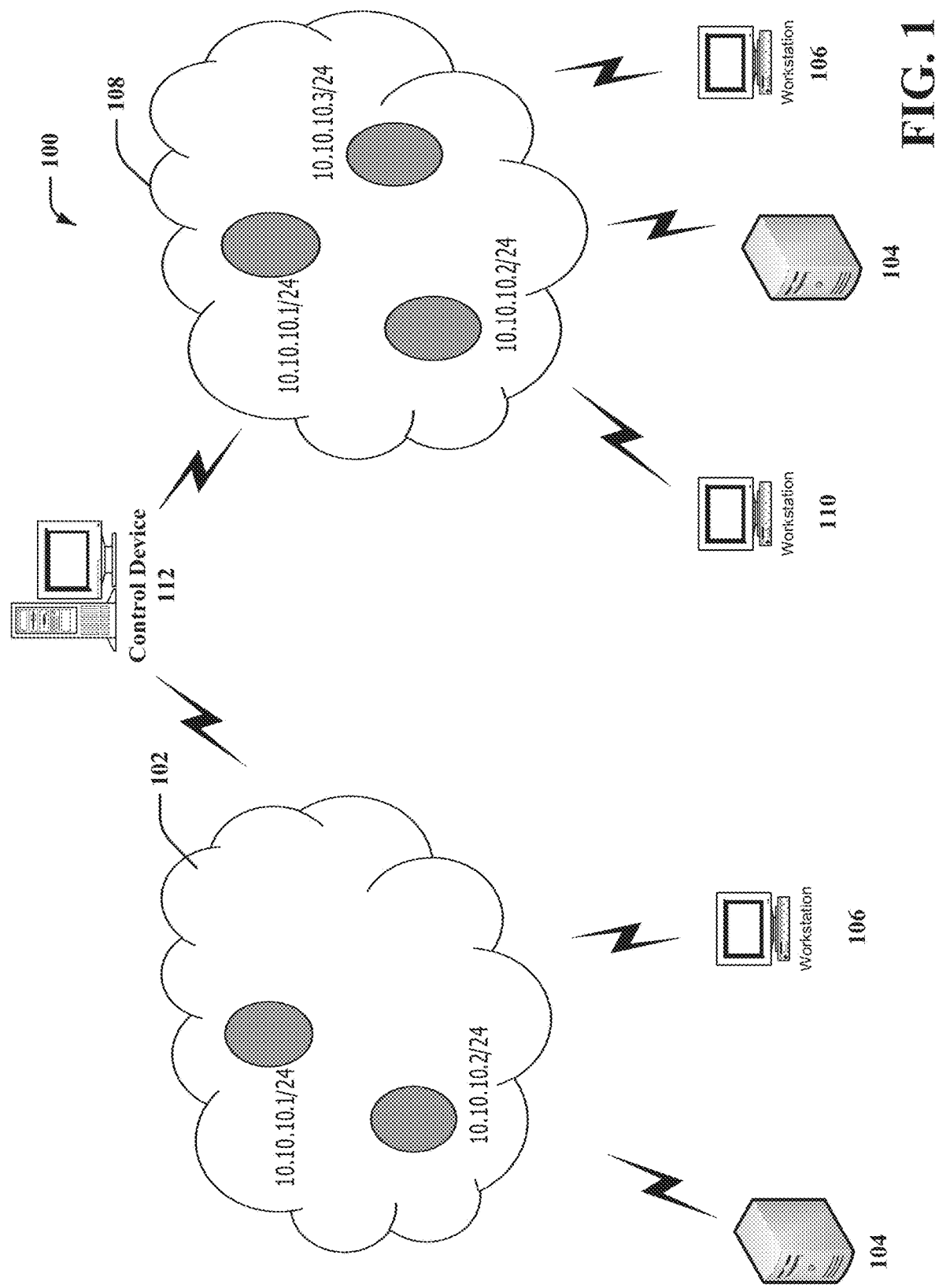
FIG. 1 illustrates a block diagram of an example, non-limiting system that facilitates grouping and patching of machines in accordance with one or more embodiments described herein.

FIG. 1 illustrates a block diagram of an example, non-limiting system that facilitates grouping and patching of machines in accordance with one or more embodiments described herein. In various embodiments, the system 100 can be associated with or included in a data analytics system, a data processing system, a graph analytics system, a graph processing system, a big data system, a social network system, a speech recognition system, an image recognition system, a graphical modeling system, a bioinformatics system, a data compression system, an artificial intelligence system, an authentication system, a syntactic pattern recognition system, a medical system, a health monitoring system, a network system, a computer network system, a communication system, a router system, a server system or the like.

As shown, system 100 can comprise a control device 112 and one or more physical machines 104, 106, 110) communicatively coupled to one or more cloud networks 102, 108. In some embodiments, the cloud networks 102, 108 can comprise virtual machines (not shown). The control device 112, physical machines 104, 106, 110 and/or one or more virtual machines can be electrically and/or communicatively coupled to one another in one or more embodiments.

In one embodiment, the control device 112 can perform patching of machines by identifying machines that share common risks. Common risks can include, but are not limited to: malware, viruses, memory leaks, cyber attacks, etc. It should be understood, with reference to this disclosure, a machine can be a server device, a virtual machine, a central processing unit (CPU), a physical machine, etc. In one embodiment, the control device 112 can group the physical machines 104, 106, 110 in the cloud network 102. The physical machines 104, 106, 110 can also be representative of the virtual machines.

In some embodiments, the physical machines 104, 106, 110 can be grouped by the control device 112 based on a common characteristic and/or a common threat or vulnerability of the physical machines 104, 106, 110. The control device 112 can be capable of monitoring individual physical machines and/or groups of physical machines. For example, the control device 112 can receive data associated with a vulnerability of the physical machine 104, if the operating systems (OS) of the physical machine has experienced a memory leak. Because physical machine 106 is grouped with physical machines 104 in the cloud network 102, the control device 112 can determine that physical machine 106 may also be in jeopardy of a memory leak, and the vulnerability of physical machine 104 can expose the OS of physical machine 106 to attacks. Therefore, the control device 112 can apply a common patch to the software, middleware, and/or OS running within the environment associated with the cloud network 102 to mitigate the vulnerability. It should also be understood that from time-to-time, the control device 112 can perform system checks on the physical machines 104, 106, 110 to preemptively determine if there is a vulnerability associated with one or more of the physical machines rather than wait for the data to be sent from the physical machines 104, 106, 110.

In some embodiments, cloud operations such as migration, scalability, snap-shot, and replication can result in a change of state of the application or physical machine. For example, the control device 112 can determine that a change has occurred in a state (e.g., in use, rebooting, etc.) of an application or physical machine. As such, a change in state can change the data structure of the environment, and in one or more embodiments described herein, prompt a group to change by the control device 112, resulting in a dynamic environment change. For instance, at a first point in time, a physical machine can run an application in a first geographical area, and at a second point in time, the application can be run in a second geographical area by another physical machine. Because the application can be run in various geographic locations due to migration, scaling out multiple instances of the application into geographically distributed data centers can increase vulnerability exposure. Thus, in various embodiments described herein, patch groups can be dynamically recomposed whenever there is a change in the environment.

Consequently, in response to another physical machine 110 exhibiting the same characteristics and/or vulnerabilities as the physical machines 104, 106 associated with the cloud network 102, then the control device 112 can group into the cloud network 108 the physical machine thereby causing a dynamic environment change. In a dynamically changing environment, change of space of physical machines or data structures is also common. Thus, the control device 112 can transmit information to physical machines 104, 106, 110 to cause a change in the patch group and/or to cause patches to be applied to software associated with the physical machines 104, 106, 110. A patch group is a group of machines operating within the same environment that can benefit from the same software patch to mitigate common vulnerabilities. Because some machines can share common vulnerabilities, grouping the machines together and applying a patch to the group can create a better defense and/or security against common vulnerabilities, as opposed to patching the machines separately.

Patches can be developed and transmitted to and/or received by the machines to fix or mitigate machine vulnerabilities. Patches can be rated in terms of vulnerability and impact the patch can have on a fix. Thus, measuring the vulnerability of software can be represented as common vulnerability of exposure (CVE) number. For example, the CVE involves the scoring of the vulnerability (e.g., low, medium, high). Consequently, a patch can be associated with a CVE number (e.g., score of 0-10). Thus, the higher the risk of exposure, the higher the CVE number. Therefore, a score of ten can indicate an immediate need for the issue to be remedied. For example, if a specific physical machine has a CVE of ten, then a patch with a rating of ten can be applied to the physical machine to mitigate a vulnerability. Furthermore, the patches can be applied to software running in any environment, which is especially important in for the cloud network 102, 108 operations because anyone can access the cloud.

In the cloud network 102, 108, machines can have applications running on multiple servers. Therefore, if one server is compromised, then the other servers can be compromised. For example, if a firewall associated with a server is breached, then one or more of the servers behind that firewall can be seen (not just the server that experienced the breach). Therefore, patching a group of servers that share a common vulnerability can generate system efficiencies. Based on the vulnerability and/or the CVE, the control device 112 can determine exactly what patch is to be used to mitigate the vulnerability.

The system 100 can be employed to use hardware and/or software to solve problems that are highly technical in nature (e.g., software patching, machine grouping, stream clustering, etc.), that are not abstract and that cannot be performed as a set of mental acts by a human due to the processing capabilities needed to facilitate machine grouping and patching, for example. Further, some of the processes (e.g., computer processing, vulnerability pattern recognition, etc.) performed may be performed by a specialized computer for carrying out defined tasks related to memory operations. For example, a specialized computer can be employed to carry out tasks related to software patching or the like. The specialized computer can automatically adjust the cloud network environment in response to an indication that a physical machine 104, 106, 110 is susceptible to a vulnerability.

Figure 2:
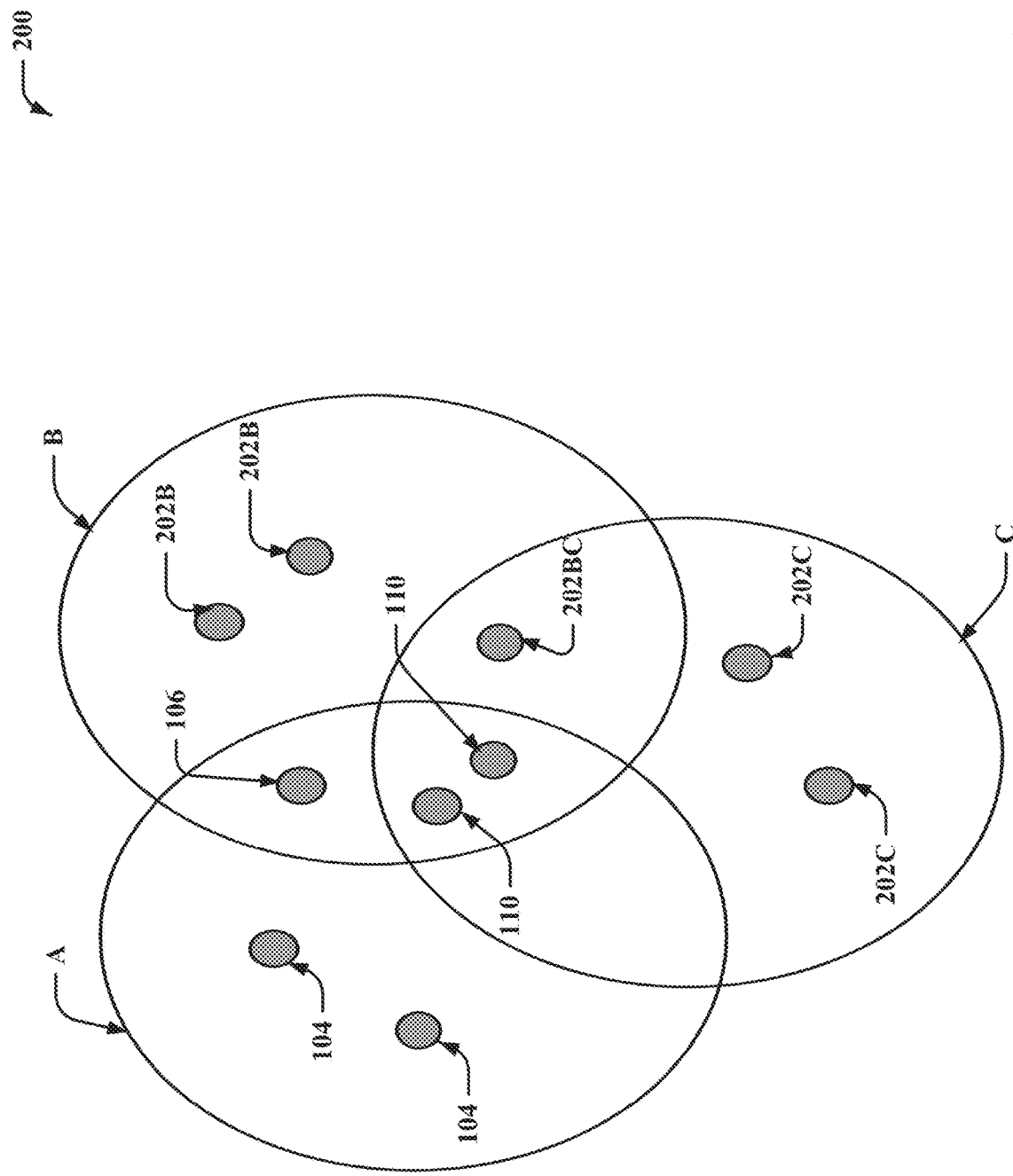
FIG. 2 illustrates another block diagram of an example, non-limiting system that facilitates a machine grouping analysis in accordance with one or more embodiments described herein.

FIG. 2 illustrates another block diagram of an example, non-limiting system 200 that facilitates a machine grouping analysis in accordance with one or more embodiments described herein. Repetitive description of like elements employed in other embodiments described herein is omitted for sake of brevity.

In another embodiment, the control device 112 can perform machine grouping based on characteristics associated with the physical machines. For example, as depicted in FIG. 2, group A, physical machines can be a workload group of machines, group B physical machines can be a network group of machines, and group C physical machines can be an infrastructure group of machines.

Although the control device 112 can group the physical machines separately according to their function (e.g., workload, network, infrastructure, etc.), certain physical machines can comprise multiple characteristics and be grouped into multiple groups. For instance, two of the physical machines 110 can be grouped into all three groups A, B, C. Therefore, there is an overlap of all three groups A, B, C for the physical machines 110. Consequently, if any of the other physical machines 104, 202B, 202C within any of the other groups ABC are exposed to a vulnerability, then the two physical machines 110 associated with all three groups A, B, C are also exposed to the same vulnerability. Therefore, if any of the other physical machines 104, 202B, 202C within any of the other groups receive a particular patch from the control device 112, then the two physical machines 110 can also receive the same patch from the control device 112. Likewise, a physical machine 104 is associated with groups A, B. Therefore, if any of the physical machines 104, 202B are exposed to a vulnerability, then the physical machine 104 can also be exposed to the vulnerability. Therefore, the patches applied to the physical machines 104, 202B should also be applied to physical machines 104. It should be understood that although every variance of the aforementioned scenario is not discussed with regards to FIG. 2, the same principles can be applied to other physical machines that are grouped in a like manner.

Figure 3:
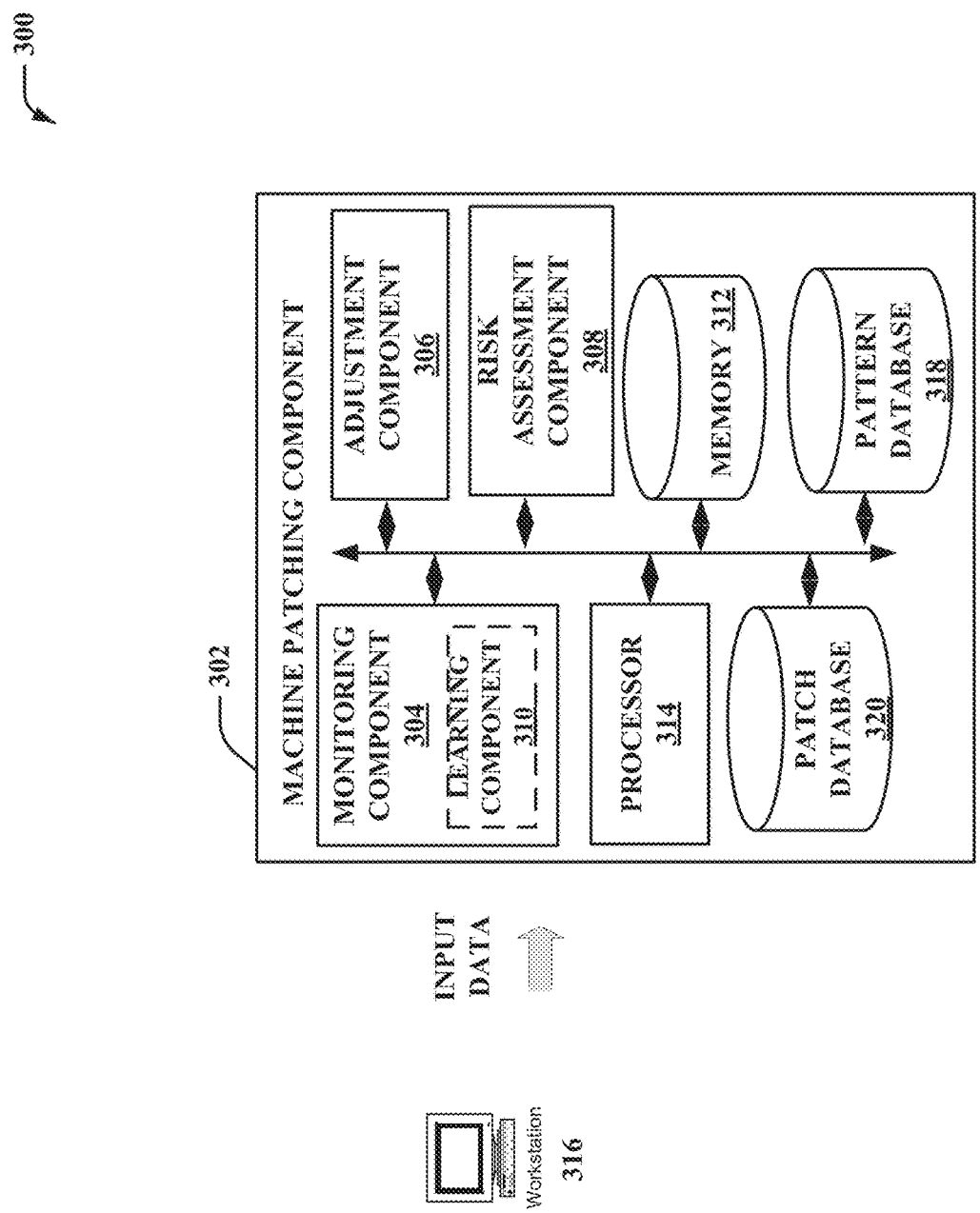
FIG. 3 illustrates an additional block diagram of an example, non-limiting machine patching component in accordance with one or more embodiments described herein.

FIG. 3 illustrates an additional block diagram of an example, non-limiting machine patching component in accordance with one or more embodiments described herein. Repetitive description of like elements employed in other embodiments described herein is omitted for sake of brevity.

In the embodiment shown in FIG. 3, the system 300 can comprise a machine patching component 302 that can receive input data from a remote workstation device 316. It should be noted that the sub-components (e.g., monitoring component 304, learning component 310, adjustment component 306, risk assessment component 308, pattern database 318, and patch database 320), processor 314, and memory 312 can be electrically and/or communicatively coupled to one another. It should also be noted that in alternative embodiments that other components including, but not limited to the sub-components, processor 314, and/or memory 312, can be external to the machine patching component 302. For instance, in another embodiment, the pattern database 318 and the patch database 320 can be external to the machine patching component 302.

In one aspect of FIG. 3, the risk assessment component 308 can assess a risk associated with a server device. For example, a risk can be determined based on a previous risk, software, a manual input, a degradation in performance, etc. For instance, if the control device 112 receives an indication that a physical machines 104, 106, 110 has experienced a reduction in performance, then the control device 112 can scan the physical machine 104, 106, 110 for an indication of malware. If the malware is found, then the control device can determine a CVE associated with the malware and send a patch that correlates to the CVE associated with the malware. Once a risk has been determined, by the risk assessment component 308, with regards to a first server device, the risk assessment component 308 can patch a server group to mitigate a vulnerability of the first server device and a second server device of the server group. The monitoring component 304 can monitor a risk associated with various machines. For instance, if a third server device of the server group experiences a vulnerability, then the monitoring component 304 can observe the vulnerability and indicate that other server devices of the server group should be patched simultaneously with the third server device.

The monitoring component 304 can also comprise a learning component 310, wherein the learning component 310 can analyze previous risks and input data received from the remote workstation device 316 to predict future risks or vulnerabilities to the server devices. For example, if the physical machine 104 has previously been prone to malware attacks, the malware attack, the physical machine 104, and the software patch to mitigate the malware attack can be stored in accordance with a learning algorithm. The learning algorithm can then use the aforementioned data to determine if the same or similar malware attack can occur on the physical machine 104 and share the same or similar patch with a grouped physical machine 106.

The learning component 310 can employ a probabilistic and/or statistical-based analysis to prognose or infer an action that can be performed. A support vector machine (SVM) is an example of a classifier that can be employed. The SVM can operate by finding a hypersurface in the space of possible inputs. Other directed and undirected classification approaches include, for example, naïve Bayes, Bayesian networks, decision trees, neural networks, fuzzy logic models, and probabilistic classification models providing different patterns of independence can be employed. Classification of risks in accordance with CVE numbers as used herein also may be inclusive of statistical regression that is utilized to develop models of priority. The disclosed aspects can employ classifiers that are explicitly trained (e.g., via a generic training data) as well as implicitly trained (e.g., via observing the input terms usage as it relates to software code, receiving extrinsic information, and so on).

The learning component 310 can utilize the SVM to employ a learning-based algorithm for multi-labels for group patterns. Multi-label group patterns are group patterns that are associated with different environments. For example, a group pattern can be associated with a network ground and still be associated with an infrastructure group. Inputs to the SVM can comprise: labeled set $D_l$, unlabeled set $D_u$, number of steps T, number of examples per iteration St=1. While t<=T a multi-label SVM classifier f can be trained based on the training data $D_l$. For one or more instances where x in $D_u$, the SVM can predict a label vector y using a loss reduction (LR) based prediction method:

$$D^*_s = \arg\max_{D_s}(\Sigma_{X \in Ds} \Sigma_{i=1}((1-\underline{y}^i f_i(x))/2)), \quad \text{Equation 1}$$

constrained to $\underline{y}^i \in \{-1, 1\}$ (equation for Maximum loss reduction with maximal confidence).

An expected loss reduction can be calculated with the most confident label vector $\underline{y}$:

$$\text{score}(x) = \Sigma_{i=1}^k ((1-\underline{y}^i f_i(x))/2) \quad \text{Equation 2}$$

The score(x) can be sorted by the learning component 310 in decreasing order for all x in $D_u$. Thus, a set of S examples $D^*_s$ with the largest scores can be selected (or input via the remote workstation device 316), and the training set $D_l \leftarrow D_l + D^*_s$ can be updated. Thereafter, the multi-label learner l with $D_l$ can be trained by the learning component 310, where t=t+1. $f_i(x)$ is an SVM classifier associated with class i. The $x_1 \ldots x_n$ data points can feature vectors for one or more grouping patterns such as: network segments, workloads, data-driven. The learning algorithms can be used to define group patterns and to reuse history to capture patterns and repeatedly use patches for known vulnerabilities.

The adjustment component 306 can modify and/or adjust the cloud network 102, 108 environment. For instance, if a particular physical machine 104 is prone to heightened risk factors, then the adjustment component 306 can remove the physical machine 104 from the group of physical machines 106, 110 to mitigate the risk. It should be noted that the adjustment component 306 can also add a physical machine 110 to a specific group of physical machines 104, 106 so that a patch associated with the physical machine 110 can be applied to the other physical machines 104, 106. Conversely, a remote workstation device 316 can be used to provide additional input data for analysis by the machine patching component 302. For example, in response to an automated process conflicting with a user input from the remote workstation device 316, the user input can override the automated process.

The input data from the remote workstation device 316 can be sent to the learning component 310 for analysis and reuse by the machine patching component 302. Input data from the remote workstation device 316 can also be stored in the patch database 320 and/or the pattern database 318. The pattern database 318 can be configured to store data associated with the patch groups, clustering, dynamic environments, and to identify patterns associated therewith. For example, patterns recognized by the learning component 310 can be stored in the pattern database 318. The patch database 320 can be configured to store data related to various patches and which vulnerabilities they mitigate for certain patch groups.

Aspects of the processor 314 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described by the machine patching component 302. In an aspect, the machine patching component 302 can also include memory 312 that stores computer executable components and instructions.

Figure 4:
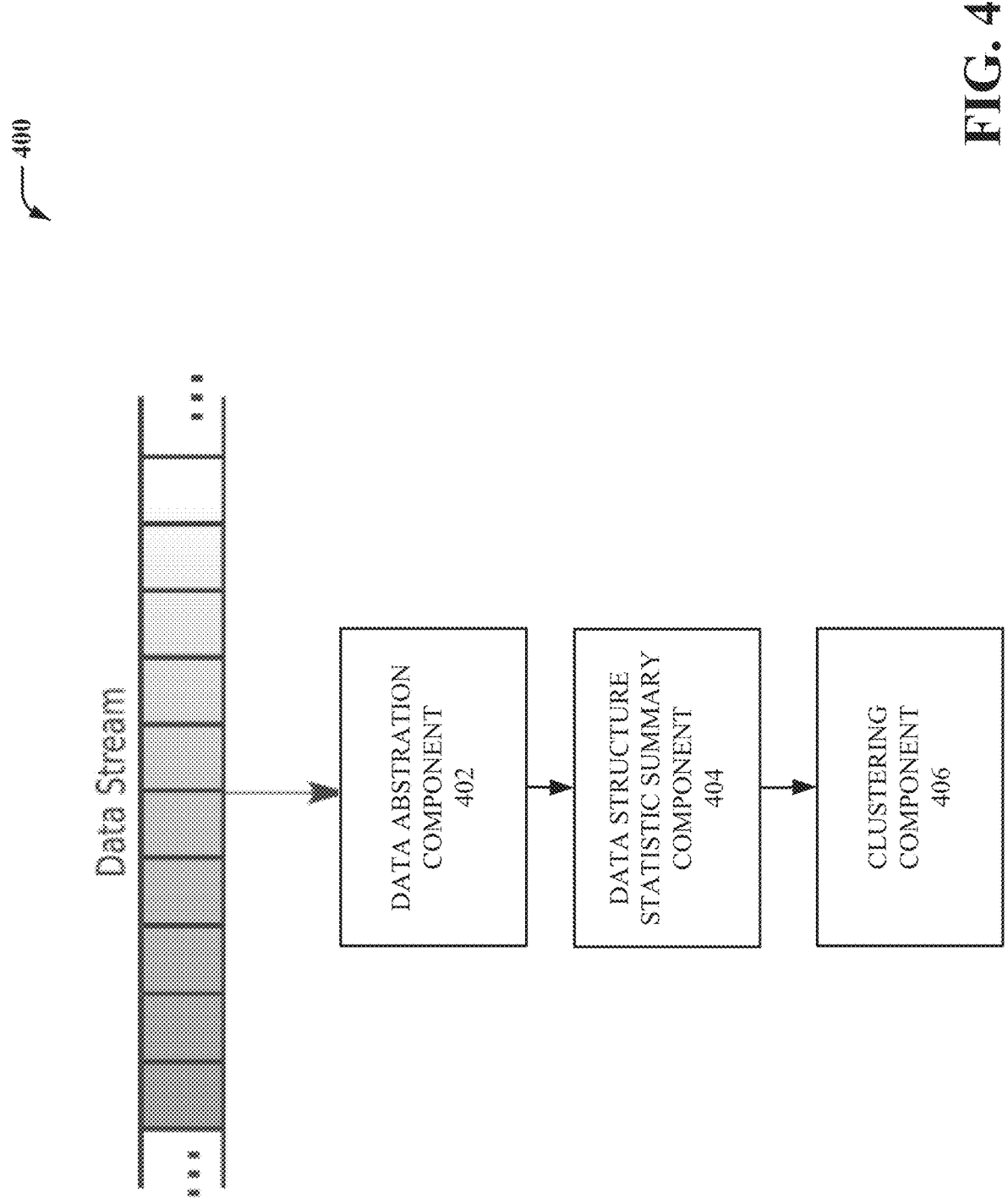
FIG. 4 illustrates yet another block diagram of an example, non-limiting system that facilitates stream clustering in accordance with one or more embodiments described herein.

FIG. 4 illustrates yet another block diagram of an example, non-limiting system 400 that facilitates stream clustering in accordance with one or more embodiments described herein. Repetitive description of like elements employed in other embodiments described herein is omitted for sake of brevity.

System 400 comprises a data abstraction component 402, a data structure statistic summary component 404, and a clustering component 406, wherein the aforementioned components are electrically and/or communicatively coupled to one another.

In response to the control device 112 determining that the physical machine 104 is experiencing a lag, the control device 112 can generate and send control information to the physical machine 106 to cause the physical machine 106 to increase speed of operations to compensate for the performance of the physical machine 106 (e.g., dynamic environment change). As such, the control device 112 can group the physical machine 104 and the physical machine 106 in different groups. Because data points can be continuously and constantly received in response to dynamic environment changes, data streams can be handled as a chunk of data. Clustering algorithms to create and/or delete physical machine groups can be used to modify a cloud network 102, 108. The continual data streams can represent and cause a change in the environment. Therefore, when the clustering algorithm is executed (in units of micro-clusters as later discussed with regards to FIG. 5), the data abstraction component 402 can summarize the data as inputs to the algorithm. Because the data can be specific or custom to its data source, the data can be formatted (e.g., average, frequency, etc.) in accordance with a target data structure of the data structure statistic summary component 404. The clustering component 406 can then receive the formatted data to perform the clustering.

Figure 5:
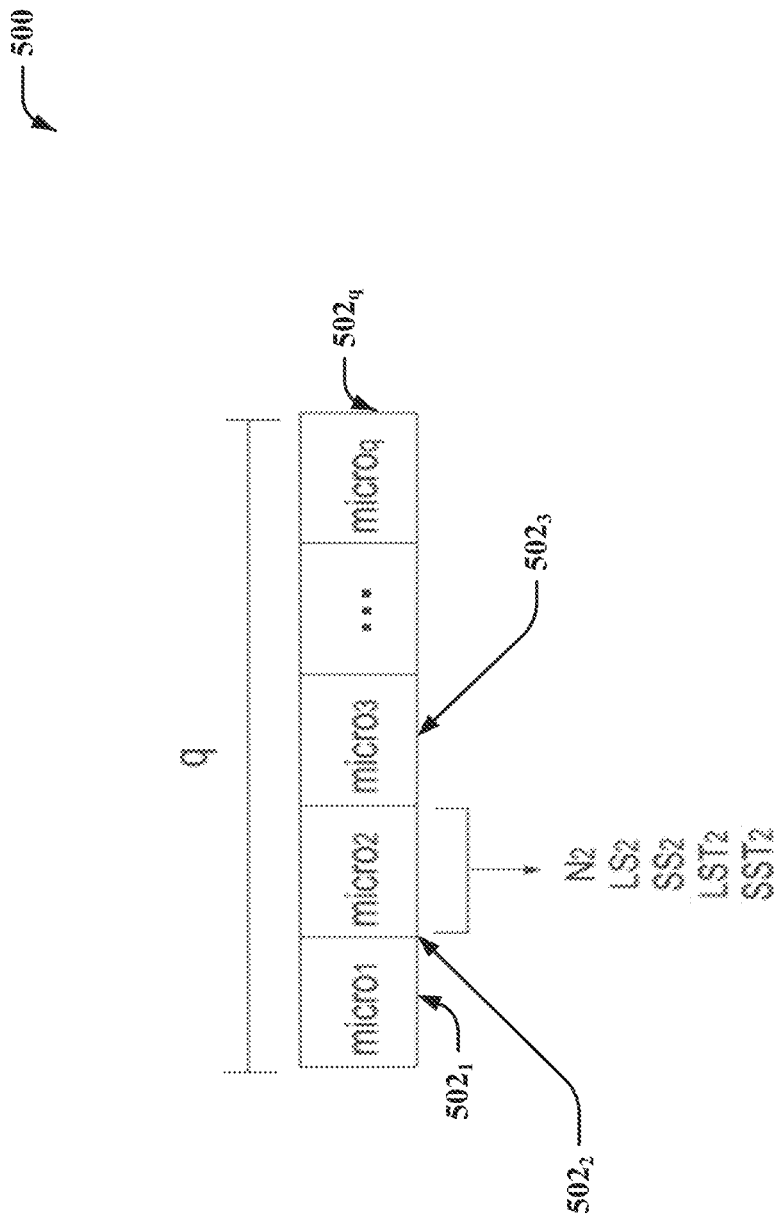
FIG. 5 illustrates an additional block diagram of example, non-limiting system that facilitates micro-stream clustering in accordance with one or more embodiments described herein.

FIG. 5. illustrates an additional block diagram of example, non-limiting system that facilitates micro-stream clustering in accordance with one or more embodiments described herein. Repetitive description of like elements employed in other embodiments described herein is omitted for sake of brevity.

The system 500 can comprise segmented data packets as micro-clusters $502_1 \ldots 502_q$. It should be understood that various stream-based clustering algorithms (e.g., micro-clusters) can perform clustering differently. For example, the clustering component 406 can generate a list of micro-clusters $502_1 \ldots 502_q$. Various names can represent the micro-cluster $502_2$: $N_2$, $LS_2$, $SS_2$, $LST_2$, and $SST_2$. Additionally, one or more physical machines 104, 106, 110 can be represented by a micro-cluster name Therefore, the control device 112 can quickly identify a physical machine and one or more micro-clusters with which the physical machine can be associated.

Figure 6:
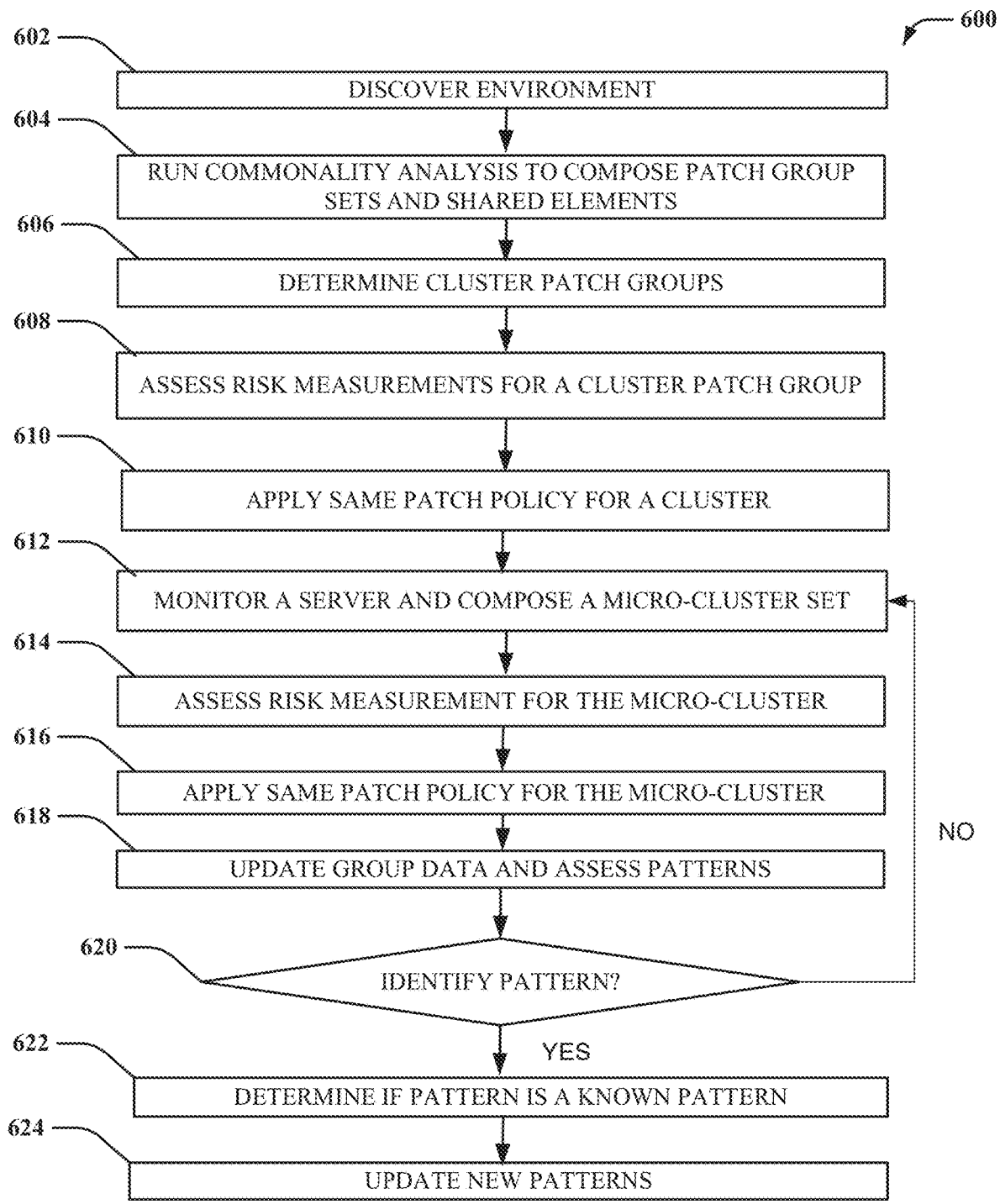
FIG. 6 illustrates a flow diagram of an example, non-limiting process overview in accordance with one or more embodiments described herein.

FIG. 6 illustrates a flow diagram of an example, non-limiting process overview in accordance with one or more embodiments described herein. Repetitive description of like elements employed in other embodiments described herein is omitted for sake of brevity.

The method 600 can be used to facilitate the aforementioned systems. At element 602, the environment from which physical machines are operating in can be discovered, noting that the environment is subject to dynamically change. The system can run a commonality analysis to compose patch group sets and shared elements at element 604 (e.g., via the risk assessment component 308). The commonality analysis can be based on a perceived vulnerability associated with a physical machine. At element 606, based on data received from the patch database 320, the physical machines can be determined to be cluster patch groups, and at element 608 risk measurements for a cluster patch group can be assessed (e.g., via the risk assessment component 308).

Based on the risk measurements at element 608, a patch policy can be applied to the cluster patch group at element 610 (e.g., via the monitoring component 304). At element 612, a server can be monitored (e.g., server addition, server deletion, etc.) and a micro-cluster set can be composed (e.g., via the monitoring component 304). The risk measurement can then be assessed for the micro-cluster at element 614 (e.g., via the risk assessment component 308), and another patch for the micro-cluster can be applied (e.g., via the monitoring component 304) at element 616. At element 618, group data can be updated and assessed against patterns stored in the pattern database 318. At element 620, the system can determine if patterns are known (e.g., via the learning component 310 that leverages machine learning algorithms). At element 620, the method 600 can comprise identifying patterns associated with vulnerabilities and patch grounds. If no patterns are found, then the process can repeat at element 612. However, if patterns are found, then the pattern can be determined as a known pattern at element 622 and updated in the pattern database 318. Consequently, at element 624, new patterns can be updated to be monitored at element 612.

Figure 7:
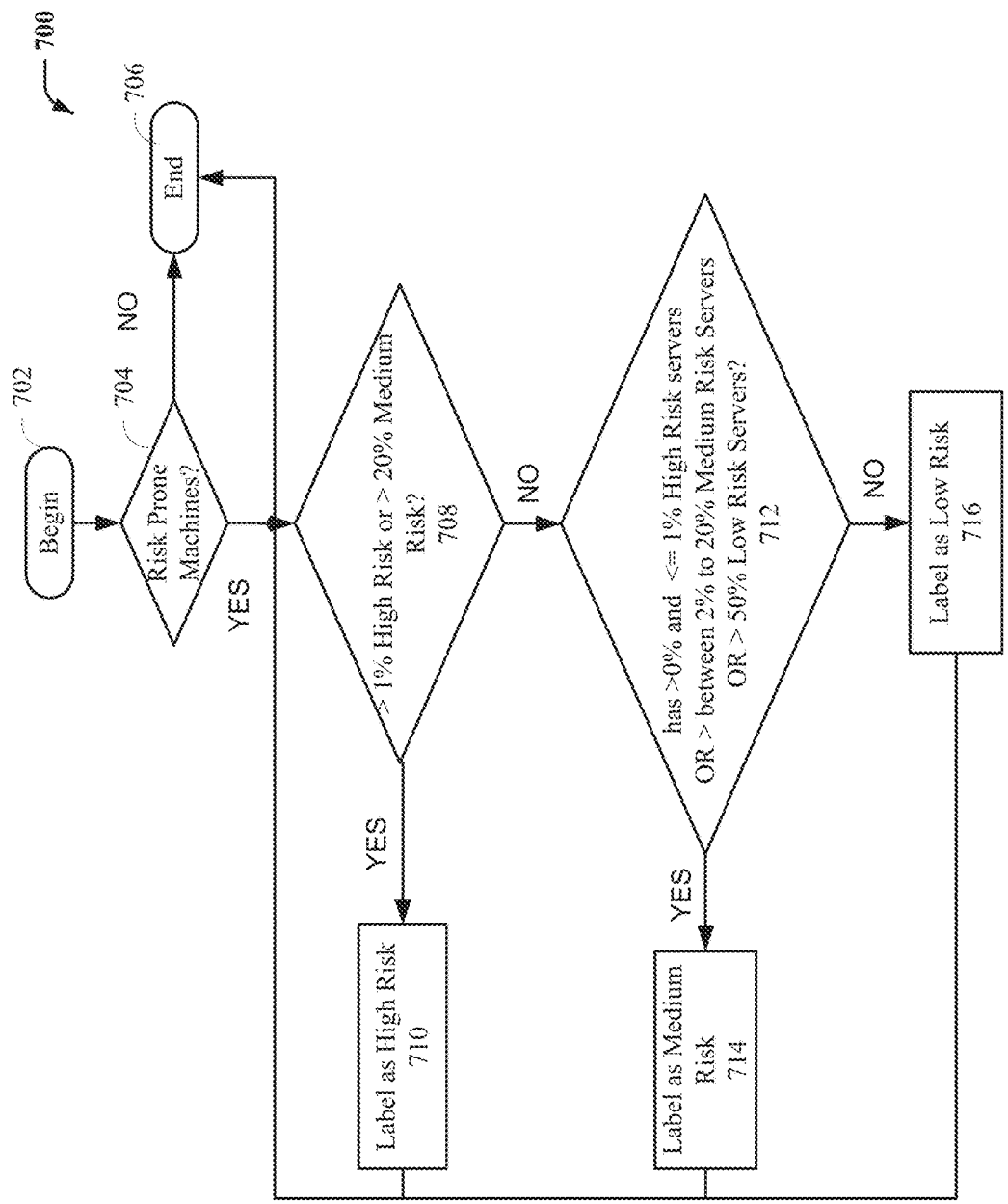
FIG. 7 illustrates a flow diagram of an example, non-limiting flow diagram that facilitates assessments for risk measurements in accordance with one or more embodiments described herein.

FIG. 7 illustrates a flow diagram of an example, non-limiting flow diagram that facilitates assessments for risk measurements 700 in accordance with one or more embodiments described herein. Repetitive description of like elements employed in other embodiments described herein is omitted for sake of brevity.

A process for assessing risk measurements can begin at block 702. The system can determine if a machine is prone to risks (e.g., via the risk assessment component 308) at block 704. If the machine is not prone to risk, then the process can end at block 706. However, if the system does identify a risk prone machine at block 704, then the system can evaluate (e.g., via the monitoring component 304) the risk associated with the machine. For example, if there is greater than a one percent chance of a high risk and/or there is greater than a twenty percent medium risk, then the machine can be labeled as a high risk machine (e.g., via the risk assessment component 308) at block 710, and the process can end at block 706. Conversely, if the high risk is less than one percent and/or less than a twenty percent of a medium risk, then the system can proceed to check for other risk factors. If the system then determines that a server has greater than zero percent and less than or equal to one percent high risk machines, or greater than between two percent to twenty percent medium risk machines, or greater than fifty percent low risk machines, then the machines can be labeled (e.g., via the risk assessment component 308) as a medium risk, and the process can proceed to end at block 706. Conversely, if any of the aforementioned factors are not met, then the system can label the machine (e.g., via the risk assessment component 308) as a low risk at element 716 and proceed to end at block 706. It should be understood that although the aforementioned risk percentages and partitions are used in relation to this disclosure, other percentages and partitions can be used based on risk thresholds.

FIG. 8 illustrates a flow diagram of an example, non-limiting computer-implemented method 800 that facilitates grouping and patching of machines in accordance with one or more embodiments described herein. Repetitive description of like elements employed in other embodiments described herein is omitted for sake of brevity.

At element 802, method 800 comprises, in response to a first risk associated with a first server device, patching (e.g., via the risk assessment component 308), by a device operatively coupled to a processor, a server group to mitigate a vulnerability of the first server device and a second server device, wherein the server group is comprised of the first server device and the second server device. At element 804, method 800 comprises monitoring (e.g., via the monitoring component 304), by the device, data associated with a second risk to the server group to mitigate the second risk to the server group.

Figure 9:
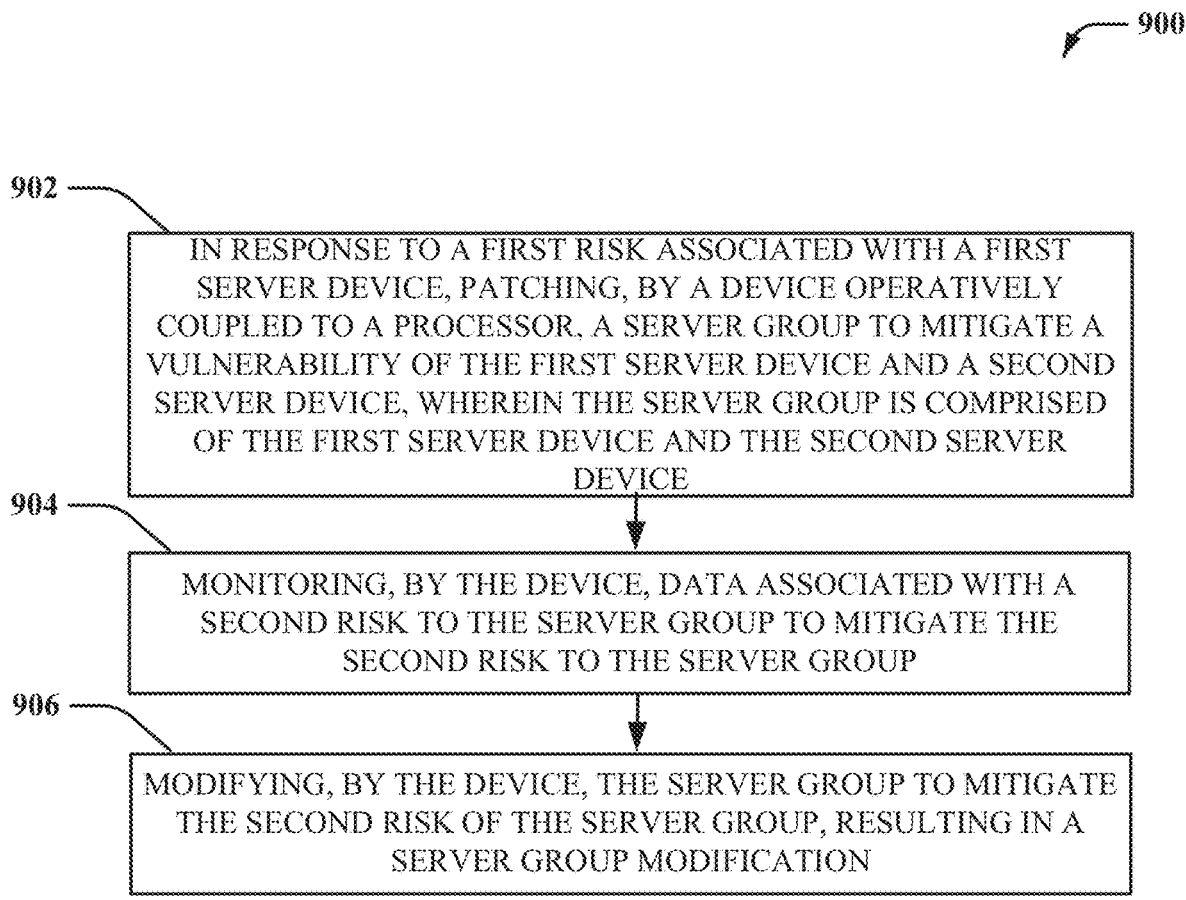
FIG. 9 illustrates a flow diagram of another example, non-limiting computer-implemented method that facilitates grouping and patching of machines in accordance with one or more embodiments described herein.

FIG. 9 illustrates a flow diagram of another example, non-limiting computer-implemented method 900 that facilitates grouping and patching of machines in accordance with one or more embodiments described herein. Repetitive description of like elements employed in other embodiments described herein is omitted for sake of brevity.

At element 902, method 900 comprises, in response to a first risk associated with a first server device, patching (e.g., via the risk assessment component 308), by a device operatively coupled to a processor, a server group to mitigate a vulnerability of the first server device and a second server device, wherein the server group is comprised of the first server device and the second server device. At element 904, method 900 comprises monitoring (e.g., via the monitoring component 304), by the device, data associated with a second risk to the server group to mitigate the second risk to the server group. Additionally, at element 906, method 900 comprises modifying (e.g., via the adjustment component 306), by the device, the server group to mitigate the second risk of the server group, resulting in a server group modification.

Figure 10:
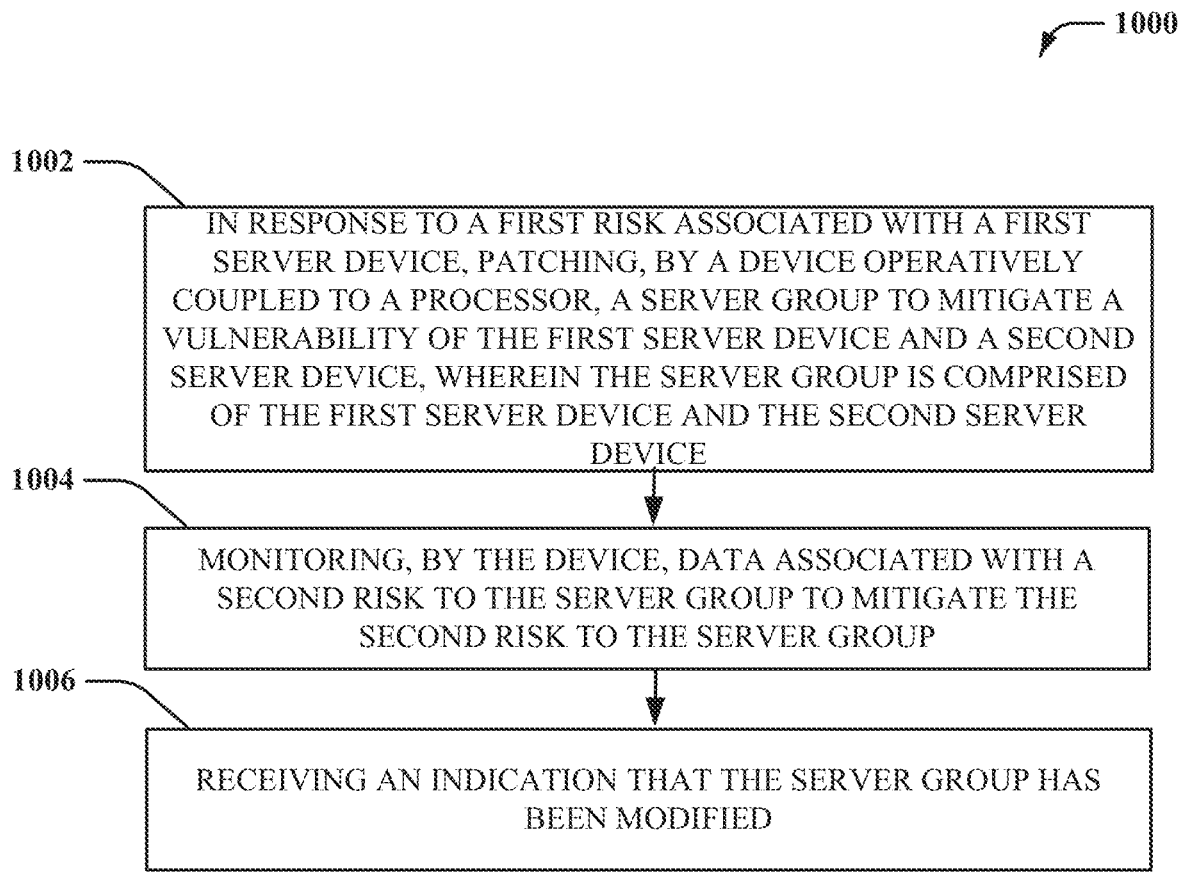
FIG. 10 illustrates a flow diagram of another example, non-limiting computer-implemented method that facilitates grouping and patching of machines in accordance with one or more embodiments described herein.

FIG. 10 illustrates a flow diagram of another example, non-limiting computer-implemented method 1000 that facilitates grouping and patching of machines in accordance with one or more embodiments described herein. Repetitive description of like elements employed in other embodiments described herein is omitted for sake of brevity.

At element 1002, method 1000 comprises, in response to a first risk associated with a first server device, patching (e.g., via the risk assessment component 308), by a device operatively coupled to a processor, a server group to mitigate a vulnerability of the first server device and a second server device, wherein the server group is comprised of the first server device and the second server device. At element 1004, method 1000 comprises monitoring (e.g., via the monitoring component 304), by the device, data associated with a second risk to the server group to mitigate the second risk to the server group. Furthermore, at element 1006, the method can comprise receiving an indication (e.g., via the adjustment component 306) that the server group has been modified.

Figure 11:
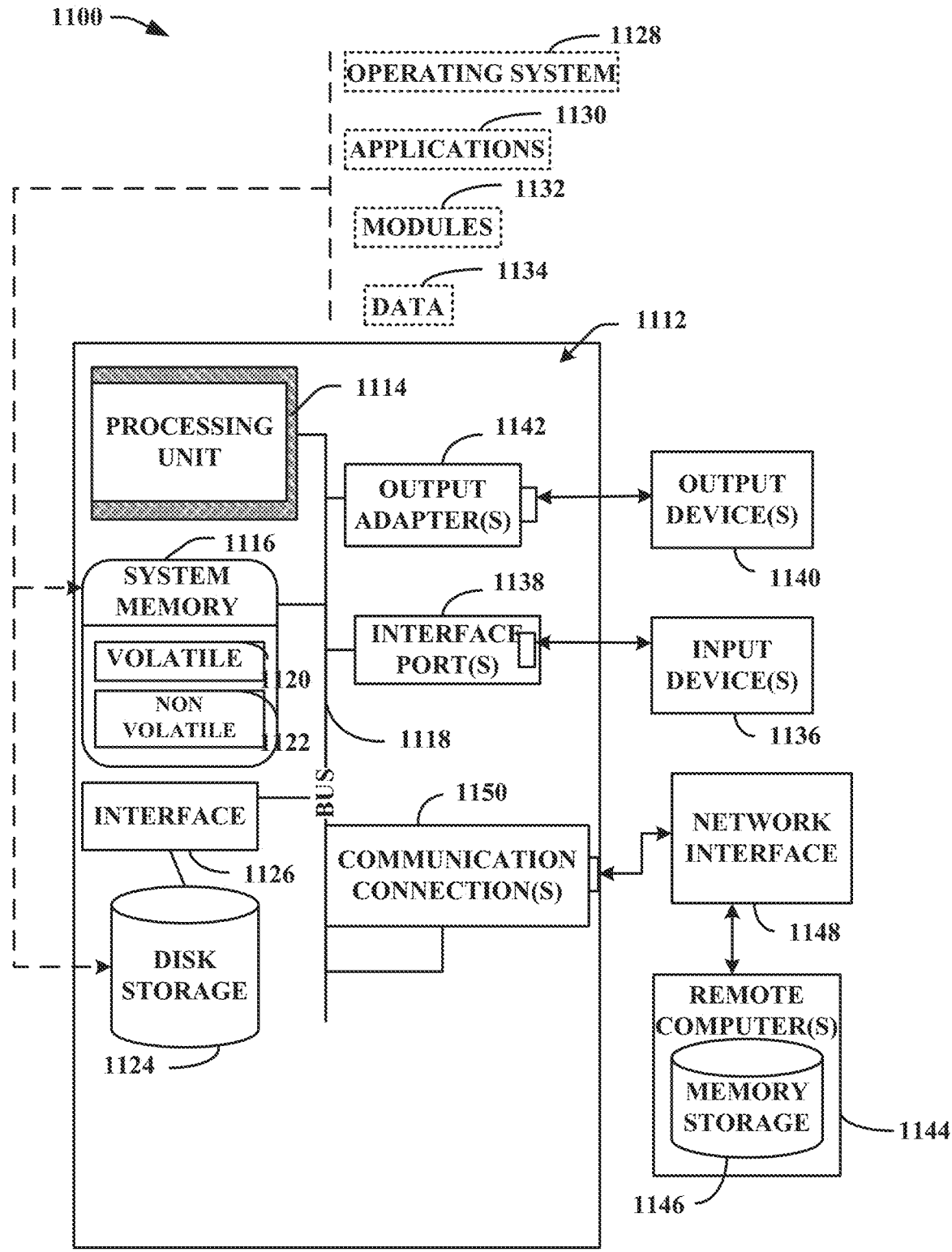
FIG. 11 illustrates a block diagram of an example, non-limiting operating environment in which one or more embodiments described herein can be facilitated.

In order to provide a context for the various aspects of the disclosed subject matter, FIG. 11 as well as the following discussion is intended to provide a general description of a suitable environment in which the various aspects of the disclosed subject matter can be implemented. FIG. 11 illustrates a block diagram of an example, non-limiting operating environment in which one or more embodiments described herein can be facilitated. Repetitive description of like elements employed in other embodiments described herein is omitted for sake of brevity. With reference to FIG. 11, a suitable operating environment 1100 for implementing various aspects of this disclosure can also include a computer 1112. The computer 1112 can also include a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114. The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1116 can also include volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1120 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1112 can also include removable/non-removable, volatile/non-volatile computer storage media. FIG. 11 illustrates, for example, a disk storage 1124. Disk storage 1124 can also include, but is not limited to, devices like a magnetic disk drive, floppy disk drive, tape drive, Jaz drive, Zip drive, LS-100 drive, flash memory card, or memory stick. The disk storage 1124 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1124 to the system bus 1118, a removable or non-removable interface is typically used, such as interface 1126. FIG. 11 also depicts software that acts as an intermediary between users and the basic computer resources described in the suitable operating environment 1100. Such software can also include, for example, an operating system 1128. Operating system 1128, which can be stored on disk storage 1124, acts to control and allocate resources of the computer 1112.

System applications 1130 take advantage of the management of resources by operating system 1128 through program modules 1132 and program data 1134, e.g., stored either in system memory 1116 or on disk storage 1124. It is to be appreciated that this disclosure can be implemented with various operating systems or combinations of operating systems. A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port can be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a computer, a server, a router, a network PC, a workstation, a microprocessor based appliance, a peer device or other common network node and the like, and typically can also include many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1150 refers to the hardware/software employed to connect the network interface 1148 to the system bus 1118. While communication connection 1150 is shown for illustrative clarity inside computer 1112, it can also be external to computer 1112. The hardware/software for connection to the network interface 1148 can also include, for exemplary purposes only, internal and external technologies such as, modems including regular telephone grade modems, cable modems and DSL modems, ISDN adapters, and Ethernet cards.

Figure 12:
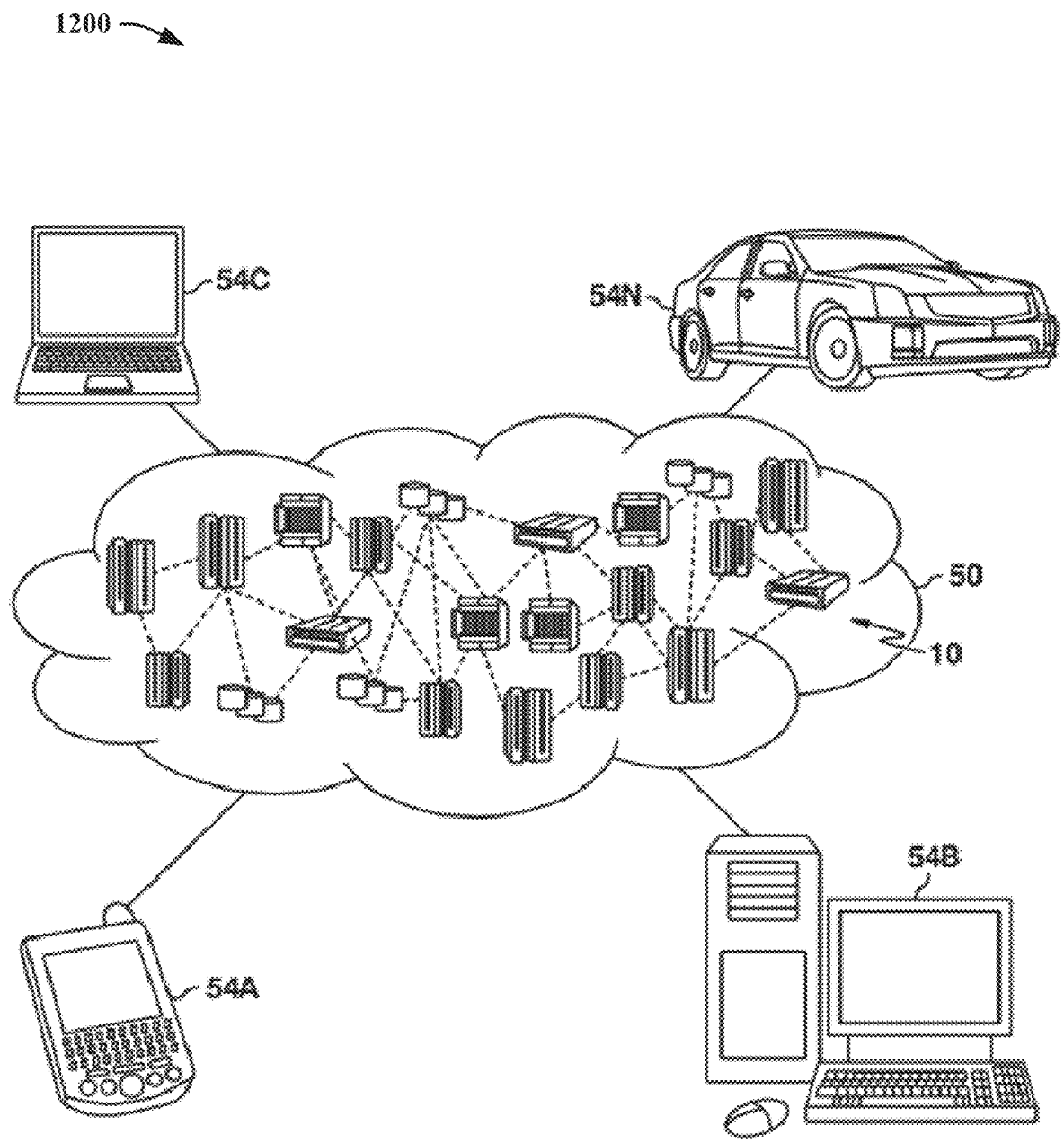
FIG. 12 illustrates a block diagram of an example, non-limiting cloud computing operating environment according to one or more embodiments described herein.

Referring now to FIG. 12, illustrative cloud computing environment 1200 is depicted. As shown, cloud computing environment 1200 includes a cloud 50 and one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows the cloud computing environment 1200 to offer infrastructure, platforms and/or software as services for which a cloud consumer does not need to maintain resources on a local computing device. It is understood that the types of computing devices 54A-N shown in FIG. 12 are intended to be illustrative only and that computing nodes 10 and the cloud 50 can communicate with any type of computerized device over any type of network and/or network addressable connection (e.g., using a web browser).

Figure 13:
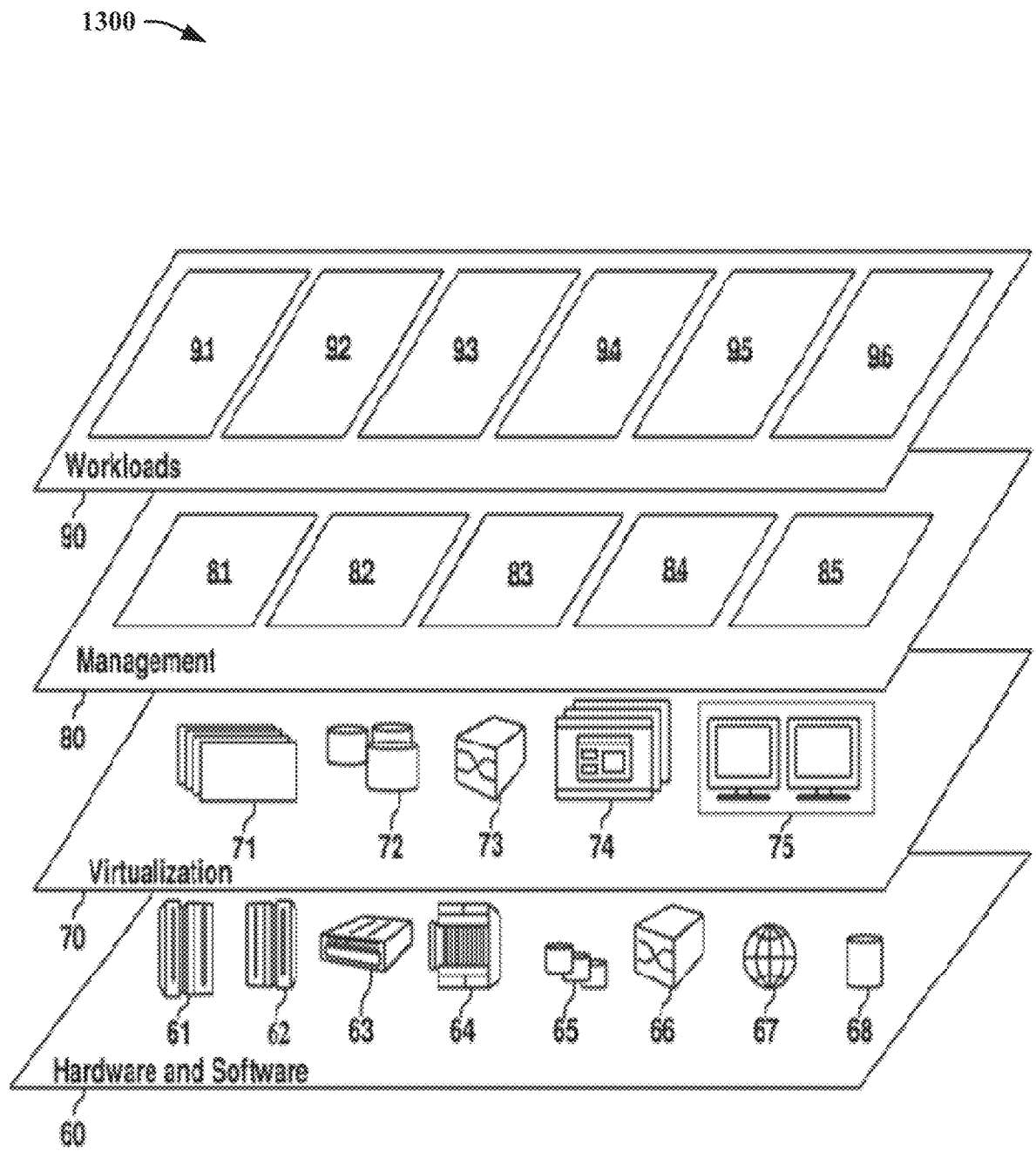
FIG. 13 illustrates a block diagram of example, non-limiting abstraction model layers according to one or more embodiments described herein.

Referring now to FIG. 13, a set of functional abstraction layers 1300 provided by cloud computing environment 1200 (FIG. 12) is shown. It should be understood in advance that the components, layers, and functions shown in FIG. 13 are intended to be illustrative only and embodiments of the invention are not limited thereto. As depicted, the following layers and corresponding functions are provided.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic re-composition of patch groups using stream clustering.

The present disclosure may be a system, a method, an apparatus and/or a computer program product at any possible technical detail level of integration. The computer program product can include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a physical machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components; and
a processor that executes the computer executable components stored in the memory, wherein the computer executable components comprise:
an adjustment component that:
identifies a subset of server devices that share at least one common vulnerability from a plurality of server devices on a network; and
adds the subset of server devices to a server group;
a risk assessment component that:
in response to a first risk associated with a first server device of the server group, patches the server devices of the server group to mitigate the first risk to the server group, wherein the server group is comprised of at least the first server device and a second server device; and
a monitoring component that:
monitors data associated with a second risk to the server group to mitigate the second risk to the server group.

2. The system of claim 1, wherein the first risk is associated with a vulnerability of the first server device to a malware attack.

3. The system of claim 1, wherein the adjustment component modifies the server group to mitigate the second risk of the server group, resulting in a server group modification.

4. The system of claim 3, wherein the server group modification removes the second server device from the server group to mitigate the second risk.

5. The system of claim 1, wherein the monitoring component receives an indication that the server group has been modified.

6. The system of claim 1, wherein the risk assessment component receives risk data representative of a risk associated with the first server device.

7. The system of claim 1, wherein the server group is a first server group, and wherein the risk assessment component assesses a third risk for a second server group that is not the first server group.

8. A computer program product that facilitates server group patching, the computer program product comprising a computer readable storage medium having program instructions embodied therewith, the program instructions executable by a processor to cause the processor to:
identify a subset of server devices that share at least one common vulnerability from a plurality of server devices on a network;
add the subset of server devices to a server group;
in response to a first risk associated with a first server device of the server group, patch the server devices of the server group to mitigate the first risk to the server group, wherein the server group is comprised of at least the first server device and a second server device; and
monitor data associated with a second risk to the server group to mitigate the second risk to the server group.

9. The computer program product of claim 8, wherein the first risk is associated with a vulnerability of the first server device to a malware attack.

10. The computer program product of claim 8, wherein the program instructions are further executable by the processor to cause the processor to:
modify the server group to mitigate the second risk of the server group, resulting in a server group modification.

11. The computer program product of claim 10, wherein the server group modification removes the second server device from the server group to mitigate the second risk.

12. The computer program product of claim 8, wherein the program instructions are further executable by the processor to cause the processor to:
receive an indication that the server group has been modified.

13. The computer program product of claim 8, wherein a risk assessment component receives risk data representative of a risk associated with the first server device.

14. The computer program product of claim 8, wherein the server group is a first server group, and wherein a risk assessment component assesses a third risk for a second server group that is not the first server group.

15. A computer-implemented method, comprising:
identifying, by a device operatively coupled to a processor, a subset of server devices that share at least one common vulnerability from a plurality of server devices on a network;
adding, by the device, the subset of server devices to a server group;
in response to a first risk associated with a first server device of the server group, patching, by the device, the server devices of the server group to mitigate the first risk to the server group, wherein the server group is comprised of at least the first server device and a second server device; and
monitoring, by the device, data associated with a second risk to the server group to mitigate the second risk to the server group.

16. The computer-implemented method of claim 15, wherein the first risk is associated with a vulnerability of the first server device to a malware attack.

17. The computer-implemented method of claim 15, further comprising:
modifying, by the device, the server group to mitigate the second risk of the server group, resulting in a server group modification.

18. The computer-implemented method of claim 17, wherein the server group modification removes the second server device from the server group to mitigate the second risk.

19. The computer-implemented method of claim 15, further comprising:
receiving an indication that the server group has been modified.

20. The computer-implemented method of claim 15, wherein a risk assessment component receives risk data representative of a risk associated with the first server device.

21. A system, comprising:
a memory that stores computer executable components; and
a processor that executes the computer executable components stored in the memory, wherein the computer executable components comprise:
an adjustment component that:
identifies a subset of server devices that share at least one common vulnerability from a plurality of server devices on a network; and
adds the subset of server devices to a server group;
a risk assessment component that:
in response to a first risk associated with a first server device of the server group, patches the server devices of the server group to mitigate the first risk to the server group, wherein the server group is comprised of at least the first server device and a second server device;
a monitoring component that:
monitors data associated with a second risk to the server group to mitigate the second risk to the server group; and
a learning component that:
analyzes risk data associated with a previous risk received from a workstation device, resulting in a risk prediction.

22. The system of claim 21, wherein the risk prediction is used as an input to the monitoring component to mitigate a third risk to the server group.

23. The system of claim 21, wherein the first risk is associated with a vulnerability of the first server device to a malware attack.

24. A computer program product that facilitates server group patching, the computer program product comprising a computer readable storage medium having program instructions embodied therewith, the program instructions executable by a processor to cause the processor to:
identify a subset of server devices that share at least one common vulnerability from a plurality of server devices on a network;
add the subset of server devices to a server group;
in response to a first risk associated with a first server device of the server group, patch the server devices of the server group to mitigate the first risk to the server group, wherein the server group is comprised of at least the first server device and a second server device;
monitor data associated with a second risk to the server group to mitigate the second risk to the server group; and
analyze risk data associated with a previous risk received from a workstation device, resulting in a risk prediction.

25. The computer program product of claim 24, wherein the risk prediction is used as an input to mitigate a third risk to the server group.

* * * * *